United States Patent Office 3,203,495
Patented Aug. 31, 1965

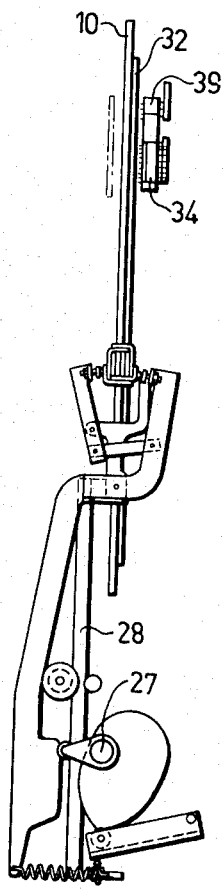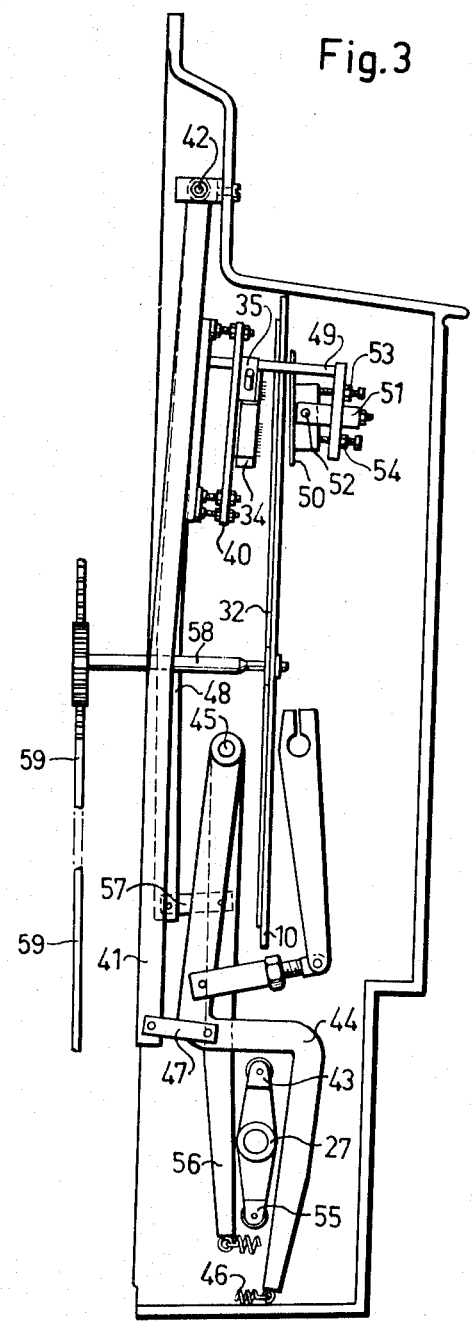

3,203,495
WEIGHT-RECORDING WEIGHING MACHINES
Nils Einar Lindberg, Korallvagen 16, and Olle Hjalmar Lundblad, Birger Jarlsgatan 5B, both of Jonkoping, Sweden
Filed Mar. 14, 1962, Ser. No. 179,759
Claims priority, application Sweden, Mar. 16, 1961, 2,813/61
10 Claims. (Cl. 177—2)

The present invention relates to an arrangement in balances or weighing machines for recording the result of the weighing operation by an electrical typewriter or the like in response to electrical pulses generated by an electrical sensing device associated with the balance.

Balances are previously known in which the electrical sensing device uses a photoelectric cell and a suitably coded transparent disc affixed to the pointed pivot shaft. A difficulty involved in this prior electric sensing device resides in that the disc has to be divided into as many sector-shaped fields or divisions as the number of weight values which the balance must be able to record. Since the recording has to be carried out at an exactitude in excess of ±0.5 per thousand, this means that each such field will be extremely narrow, necessitating the coded disc to be manufactured with an extremely high degree of accuracy.

The difficulties above referred to have been eliminated according to the present invention by the steps of designing the coded disc affixed to the pointer pivot shaft so as to record only the most significant digits of the weight value, and allotting the recording of the least significant digit or digits to a separate coded disc. This will entail the favorable result that each sector-shaped field or division on the large coded disc will be much wider, as a rule ten times wider, whereby the accuracy required is correspondingly reduced.

Due to the reduced requirements for accuracy of the code markings or indications on the respective coded discs resulting from the invention, it will be possible to equip the coded discs with rows or tracks of contacts arranged in accordance with a certain code and adapted to cooperate with contacts included in the pulse circuit. The last-mentioned contacts are preferably mounted in contact heads which are movable towards and away from the respective coded discs to cause contact engagement to be established only when, after weight-loading, the balance has reached equilibrium. In this way any slippage between said contacts and contact rows or tracks is avoided, whereby, on the one hand, any disturbing influence on the pointer reading of the balance is avoided and, on the other hand, frictional wear of the contact rows is minimized. The reduced requirements as to manufacturing accuracy and the unnoticeable wear enable, to advantage, the use of coded discs produced according to the so-called etched-circuit techniques, that is, discs coated with a thin copper foil which is etched away at locations where no contact is desired. Applying such techniques will highly economise the series fabrication of the coded discs.

The recording of weight values by an electrical typewriter in response to electric pulses generated by an electric sensing device made in accordance with the invention and associated with the balance may, to advantage, be combined with mechanical recording by means of printing types mounted on or associated with the respective coded discs. Balances are previously known in which such direct recording of pointer readings takes place and in which a separate element is employed for recording the least significant digits of the weight value. In cases where the code discs and the printing-type carrying recording elements are combined into unitary assemblies, the contact heads are suitably arranged in sectors which are angularly offset relative to the sectors within which the printing takes place.

The invention will now be explained more in detail in conjunction with the accompanying drawings, in which:

FIG. 2 illustrates the mechanism of FIG. 1 as seen in the direction of arrows II—II;

FIG. 3 shows, on a larger scale and as seen in the direction of arrows III—III in FIG. 1, the movement transmitting mechanism between the pivot shaft of the recording device of the balance and the contact heads.

Figure 1:
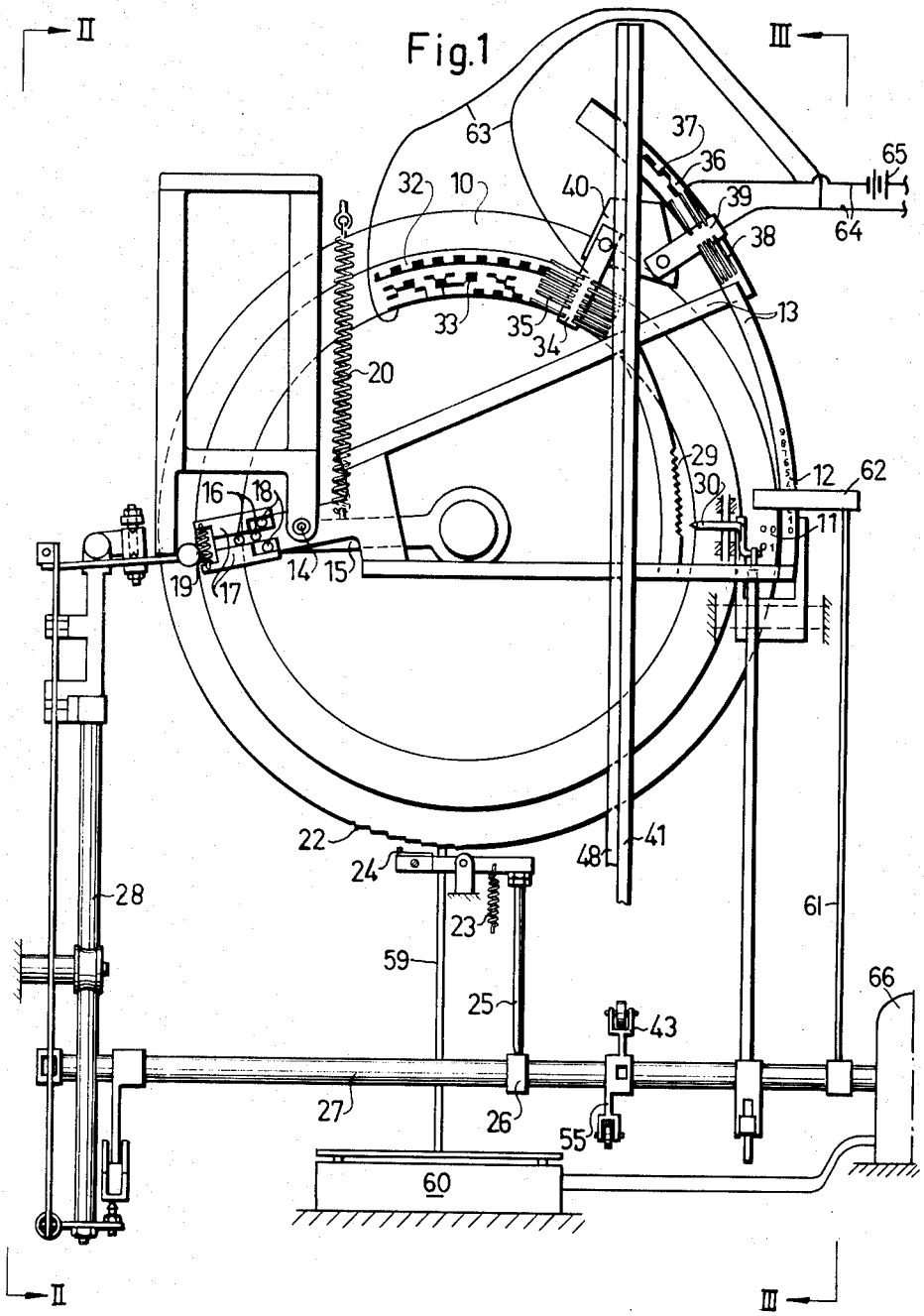
FIG. 1 illustrates, in part diagrammatically, the weight-indicating mechanism of a balance provided with an electric sensing arrangement according to the present invention.

Referring to the drawing, numeral 10 designates a circular disc affixed to the pointer pivot shaft 58 of the balance and provided near its peripheral edge with types 11 for printing the digits contained in the weight value, except the last digit. Shaft 58 is connected through appropriate gear mechanism to shaft 59 which is, in turn, connected to the platform of a weighing device 60. Thus, if the balance is intended to record weight value from 1 kg. to 999 kg. inclusive, the type disc will carry types bearing the digits representative of tens of kilograms, that is, types bearing sequentially the digits 1 to 99, inclusive. The types 12 corresponding to the units digits, that is, to the least significant digits, of the weight value, are mounted on a separate type lever 13 which is formed as a sector of a circle and is mounted to be rotatable about the fixed shaft 14. The type lever 13 is yieldingly connected with an operating lever 15 which is pivotally mounted on the pointer pivot shaft. The lever 15 carries two dog pins 16 which project in between two clamping jaws 17 which are carried by a rearward extension of the type lever 13 and are pivotable relative to the latter about pins 18, their opposite ends being interconnected by a tension spring 19 urging the jaws into the position shown in the drawing to force the jaws against the dog pins 16. A spring 20 normally maintains the type lever 13 in the position shown in the drawing in which it abuts a stop, not shown.

The type disc 10 is formed around its periphery with ratchet teeth 22 interspaced by an amount, or pitch, the same as that of the type digits on the type disc. Adapted to cooperate with the ratchet teeth 22 is a pawl 24 which is acted on by a spring 23. The pawl is normally kept in a disengaged position by an endwise displaceable rod 25 operated by a cam 26 secured to the motor-driven cam shaft, or recording shaft, 27 of the balance.

In a weighing operation, as the type disc has stopped in an angular position corresponding to the weight-load put on, the recording motor 66 of the balance is started thereby rotating cam shaft 27. This will first lower the rod 25 causing the pawl 24 to be urged resiliently against the periphery of the type disc 10. Then, by means of a mechanism operated from the cam shaft and indicated only diagrammatically, the type disc 10 is coupled to the operating lever 15. Pivotally connected to the latter is the upper end of an endwise displaceable operating rod 28 the movement of which is also derived from the cam shaft or recording shaft 27. As the recoring shaft continues to rotate, the operating rod 28 is raised by the action of spring 20, carrying with it the operating lever 15 and type disc 10 coupled thereto, the latter being rotated back in the clockwise direction as seen in FIG. 1 until its nearest tooth 22 engages the pawl 24. The type disc 10 now occupies the position in which those digit types 11 which correspond to the next-lower whole tens-number are in printing position relative to the printing mechanism. Simultaneously with the backward rotation of the type disc 10, the type lever 13 is advanced by an annular amount corresponding to the units digit of the weight value, whereby the type 12 bearing the corresponding units digit will arrive substantially at its printing position. To enable the nearest correct units digit to be adjusted exactly into its correct printing position, the type lever 13 is provided with a toothed segment 29 towards which, in the printing instant, a chisel-edge ended rod or detent 30 is moved forcibly, thereby engaging the next-adjacent tooth interspace while pivoting the type lever forward or rearward into the precise position in which the units digit concerned is in alignment with the set type digit or digits on the type disc 10. In addition, shaft 27 carries fixedly attached thereto arm 61. Mounted on the upper end of arm 61, in a position to rotate against indicia 11 and 12, is printing paper holder 62.

The recording mechanism thus far described, and which is previously known per se, has been supplemented according to the present invention with an arrangement for generating electrical pulses corresponding to the weight values, or pointer readings. To this end, in accordance with the invention, there is secured to the pointer pivot shaft a contact disc 32 which may, preferably, be integrated with the type disc 10. The contact disc is provided within a circular ring adjacent to its peripheral edge with fixed electrical contacts 33 adapted to cooperate with a plurality of contact springs 35 fastened in cantilever fashion to a contact head 34, as, from an inoperative position, said contact head is urged against the contact disc in the course of a recording operation. Specifically, these contacts and contact springs are so arranged that, for each angular setting of the contact disc, contact will be established in accordance with a code characteristic of the correspondingly related pointer reading or weight value. For the purpose of generating pulses corresponding to the units digit, the type lever 13 has an arcuate extension or arm 36 carrying fixed contacts 37 adapted to cooperate with cantilever contact springs 38 mounted on a second contact head 39. This contact head, as well, normally occupies an inoperative position in which the contact springs are held away from the contact track, and are adapted to be urged into engagement with the contact track only in conjunction with the recording operation. In this case, at each setting contact will be established in accordance with a code corresponding to the units digit relative thereto.

The contact rows or tracks 33 and 37 are preferably produced according to the so-called etched-circuit technique.

The contacts carried by the respective contact heads may be, as known per se, in the form of very thin metal wires, for instance gold wires, which are resiliently guided in holes formed in the contact head and directed towards the contact tracks. Suitable electrical leads 63 are connected to contact head 34 and track 33 and leads 64 are connected to contact head 39 and track 37. Included in this circuit is a suitable source of power 65 and the circuit is completed by an appropriate signal-receiving device (not shown) connected to leads 64.

The two contact heads 34 and 39 are mounted in common on a base plate 40 rigidly mounted on an arm 51 (FIG. 3) which is pivoted on the fixed horizontal pin 42 between a position in which the contact wires are moved away from and out of contact with the respective contact tracks and a position in which they establish contact with the contact tracks. This pivotal movement is derived from the recording shaft 27 of the balance. Mounted on the latter is a cam lever 43 cooperating with a substantially S-shaped cam-follower lever 44 which is pivoted about the fixed pin 45 and normally occupies the position shown in the drawing, urged against a stop (not shown) under the action of a spring 46. Lever 44, through link 47, is connected with the arm 41 carrying the contact heads, whereby this arm will be moved to the right in the figure into its contact position when the cam shaft 27 has been rotated through 90° from its angular position shown.

An arm 48, which is likewise pivoted on the fixed horizontal pin 42, carries through the intermediary of a rod 49 a supporting plate 50 which is adapted to be moved towards the rear surface of the coded disc 32 and the coded extension or arm 36 at the same time as, or immediately before, the contacts carried by the contact heads engage the front face of the coded disc and the coded arm. Supporting plate 50 is carried by an axially adjustable arm 51 projecting at right angles from rod 49 and pivotable about the horizontal pin 52, the arm 51 being maintained in a desired angular position by two adjusting screws 53 and 54 mounted in the arm 51. The pivotal movement of arm 48 is likewise derived from the recording shaft 27 which carries a second cam lever 55 displaced by 180° relative to the cam lever 43. Cooperating with cam lever 55 is a cam-follower lever 56 pivoted about the fixed pin 45 and interconnected with arm 48 through the link 57. Obviously, by rotating the recording shaft 27 by an angular amount of 90° from the angular position shown, the contact heads 34 and 39 and the supporting plate 50 will simultaneously be moved into engagement with opposite sides of the contact disc 32 and contact arm 36, thereby establishing good electrical contact engagement without subjecting the pointer pivot shaft to any mechanical stressing which could impair the accuracy of the weight indication or registration. Obviously, the electric pulse circuit containing the contact tracks or rows and the movable contacts may be arranged in any suitable manner, for instance in a manner known per se, there being, therefore, no necessity of describing the arrangement of these circuits in greater detail in this connection.

It is understood that the invention is not restricted to the embodiment illustrated in the drawing, various modifications being conceivable within the scope of the invention. Thus, for example, it is possible to record the weight value or reading while using more than two separate recording elements. The division of the digit groups of the weight value could be made also in other ways than that shown and described. Thus, for instance, the last two or three digits of the weight value could be recorded by means of the separate code track. Further modifications are also possible.

We claim:

1. In a weight-recording device, including a rotatable shaft whose angular position is proportional to the instantaneous magnitude of the weight measured, a disc carrying numerical printing indicia, representative of the magnitude of the weight measured, associated with a printing means, and a second rotatable shaft operative by the weighing device when the final value of the weight measured is reached, the improvement comprising:
    (a) a plurality of electrical contacts secured to one side of said disc in a preselected, coded arrangement representative of corresponding ones of said numerical indicia;
    (b) a probe head pivotally mounted above said contacts and on one side of said disc and adapted to pivot toward and away from said contacts;
    (c) a plurality of electrical probes arranged in said probe head in a manner such that said probes are selectively energized when in contact with said contacts; and
    (d) actuating means connecting said second shaft to said probe head and adapted to bring said probes into contact with said contacts when said second shaft is rotated.

2. A device in accordance with claim 1 wherein the contacts comprise a thin sheet of conducting material selectively etched to produce the coded arrangement of contacts.

3. A device in accordance with claim 1 wherein the contacts are arcuate strips of conductive material equal in number to the number of digits to be indicated and having non-conductive sections at space points along their length.

4. A device in accordance with claim 3 wherein the probes are a plurality of wires arranged in a bank, one of each said wires being adapted to follow above one of the tracks as the disc is rotated.

5. A device in accordance with claim 1 wherein the actuating means includes a cam and follower.

6. A device in accordance with claim 1 which additionally includes a back-up plate, on the opposite side of the disc from the probe head, adapted to reduce the displacement of said disc when the probes are brought into contact with the contacts.

7. A device in accordance with claim 6 in which the back-up plate is pivotally mounted to pivot toward and away from the disc, and the device further includes a second actuating means connecting the second shaft to said back-up plate and adapted to bring said back-up plate into contact with said disc substantially simultaneously with the probes.

8. A device in accordance with claim 7 wherein the second actuating means includes the cam of the first actuating means.

9. A device in accordance with claim 1 which additionally includes at least one arcuately movable sector means carrying numerical indicia representative of a unit of the magnitude of the weight measured and rotatable in response to rotation of the first shaft; and, associated therewith, a plurality of second electrical contacts of the same character as the first, a second probe head of the same character as the first and mounted to pivot therewith, and a plurality of second electrical probes of the same character as the first set of probes.

10. A device in accordance with claim 9 which additionally includes a second back-up plate on the side of the sector opposite the second contacts.

References Cited by the Examiner

UNITED STATES PATENTS

| 2,030,479 | 2/36 | Strauss | 101—96 |
| 2,749,538 | 6/56 | Cooper et al. | 340—347 |
| 2,948,464 | 8/60 | Allen | 235—58 |

FOREIGN PATENTS 87,766  8/59  Denmark.

LEYLAND M. MARTIN, *Primary Examiner.*

A. BERLIN, *Examiner.*